US006385307B1

(12) United States Patent
Brablec et al.

(10) Patent No.: US 6,385,307 B1
(45) Date of Patent: May 7, 2002

(54) APPARATUS AND METHOD FOR OVERRIDING AN AUTOMATIC ANSWER FUNCTION OF A TELEPHONE ANSWERING DEVICE

(75) Inventors: Milos Brablec, Skokie; Abhay Vikram Munshi, Rolling Meadows, both of IL (US)

(73) Assignee: 3COM Corporation, Rolling Meadows, IL (US)

( * ) Notice: Subject to any disclaimer, the term of this patent is extended or adjusted under 35 U.S.C. 154(b) by 0 days.

(21) Appl. No.: 09/143,826

(22) Filed: Aug. 31, 1998

(51) Int. Cl.[7] .............................................. H04M 1/64
(52) U.S. Cl. ................... 379/88.22; 379/70; 379/88.18; 379/88.27
(58) Field of Search ................ 379/67.1, 442, 379/90.01, 102.01, 88.13, 88.22, 93.05, 905, 70, 88.18, 92.04, 88.27

(56) References Cited

U.S. PATENT DOCUMENTS

| | | | |
|---|---|---|---|
| 4,893,335 A | * 1/1990 | Fuller et al. | ................. 379/200 |
| 5,283,819 A | 2/1994 | Glick et al. | |
| 5,400,393 A | * 3/1995 | Knuth et al. | ................... 379/88 |
| 5,428,671 A | 6/1995 | Dykes et al. | |
| 5,506,891 A | 4/1996 | Brown | |
| 5,687,222 A | 11/1997 | McLaughlin et al. | |
| 5,815,567 A | * 9/1998 | Davis et al. | ................. 379/377 |
| 5,930,338 A | * 7/1999 | McKendry et al. | ...... 379/88.25 |
| 6,026,152 A | * 2/2000 | Cannon et al. | ............. 379/142 |
| 6,229,878 B1 | * 5/2001 | Moganti | .................... 379/67.1 |

OTHER PUBLICATIONS

Noll, Michael A., Introduction to Telephones and Telephone Systems, 2nd Ed., 1991, Artech House Inc., p. 23.*

* cited by examiner

*Primary Examiner*—Fan Tsang
*Assistant Examiner*—Ovidio Escalante
(74) *Attorney, Agent, or Firm*—Baniak Pine & Gannon

(57) ABSTRACT

An apparatus for overriding an automatic answer function of a telephone answering device includes a host computer in communication with the telephone answering device. The host computer includes an application running on the host computer, and the telephone answering device includes a controller operatively connected to a ring counter. The application is operatively connected to the controller. The controller resets the ring counter in response to a command prefix from the application which disables an automatic answer function of the telephone answering device and enables the application to answer an incoming call by controlling the telephone answering device.

21 Claims, 2 Drawing Sheets

APPARATUS AND METHOD FOR OVERRIDING AN AUTOMATIC ANSWER FUNCTION OF A TELEPHONE ANSWERING DEVICE

FIELD OF THE INVENTION

This invention relates generally to the field of automatic telephone answering systems and, in particular, to an apparatus and method for overriding an automatic answer function of a telephone answering device.

BACKGROUND OF THE INVENTION

There are various types of systems which automatically answer an incoming call and maintain a telephone line connection which are broadly defined as automatic telephone answering devices. These devices include, for example, automatic telephone message recording equipment, message recording systems having remote access message playback, automatic telephone call forwarding equipment, automatic dial-up alarm receiving equipment, automatic answering data entry systems, and other telephone devices used in association with modem equipment.

A telephone answering device is typically designed to automatically answer, receive, and store messages from a caller. However, the telephone answering device may be operatively connected to a host computer. The host computer typically has its own memory, and has the ability to execute a program or software that allows it to interact with the telephone answering device. In particular, the host computer may be programmed to answer, receive and store incoming messages from a caller by controlling the telephone answering device with command signals sent from host computer to the telephone answering device. Since both the telephone answering device and the host computer are able to receive and store messages from a caller, a conflict may arise between the two devices when there is an incoming call from the caller. This may result in a variety of system failures including, for example, a failed telephone connection which in return may result in the failure to detect and receive an incoming call. Accordingly, it would be desirable to have a telephone answering device in communication with a host computer that overcomes the problems described above and resolves the potential conflict that arises as a result of the message answering capabilities of each device.

SUMMARY OF THE INVENTION

One aspect of the invention provides an apparatus for overriding an automatic answer function of a telephone answering device including a host computer in communication with the telephone answering device. The host computer includes an application running on the host computer, and the telephone answering device includes a controller operatively connected to a ring counter. The application is operatively connected to the controller. The controller resets the ring counter in response to a command prefix from the application which disables an automatic answer function of the telephone answering device and enables the application to answer an incoming call by controlling the telephone answering device. A host memory may preferably be operatively connected to the application, and an application interface may be operatively connected to the controller and to the application. A serial link may be operatively connected to the application interface and the application. A memory device, a ring detector, an audio receiver, and an automatic answer ring register each may preferably be operatively connected to the controller. A 2-wire to 4-wire network circuit may preferably be operatively connected to the audio receiver, and a loop holding circuit may be operatively connected to the 2-wire to 4-wire network circuit. A switch may be operatively connected to the 2-wire to 4-wire network circuit.

Another aspect of the invention provides a method for overriding an automatic answer function of a telephone answering device. A host computer in communication with the telephone answering device is provided. The host computer includes an application running on the host computer. The telephone answering device includes a controller operatively connected to a ring counter. The application is operatively connected to the controller. The controller monitors for the presence of a command prefix from the application. A command prefix from the application is detected. The ring counter is reset to zero in response to the command prefix from the application. An automatic answer function of the telephone answering device is disabled, and the application is enabled to answer an incoming call by controlling the telephone answering device. The command prefix may preferably be an AT command prefix. The telephone answering device may preferably be turned on and placed in an "on hook" state. The host computer may preferably be turned on, and the application on the host computer may preferably be running. The telephone answering device may be enabled to receive messages. The ring counter may be reset when the telephone answering device is turned on. An application interface operatively connected to the controller and the to the application may also be provided. The application interface may preferably be enabled, and the application may be enabled to receive messages. An automatic answer ring register operatively connected to the controller may also be provided. The automatic answer ring register may preferably be set to a threshold number of rings that will trigger the automatic answer function of the telephone answering device. A ring detector operatively connected to a General Switched Telephone Network (GSTN) and to the controller may also be provided. Rings from the GSTN may be detected and counted. A ring response signal may be sent from the controller to the application. The number of rings detected by the ring counter may preferably be compared with the threshold number of rings, and the telephone answering device may be enabled to answer an incoming call if the number of detected rings is equal to or greater than the threshold number of rings.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE PRESENTLY PREFERRED EMBODIMENTS

Figure 1:
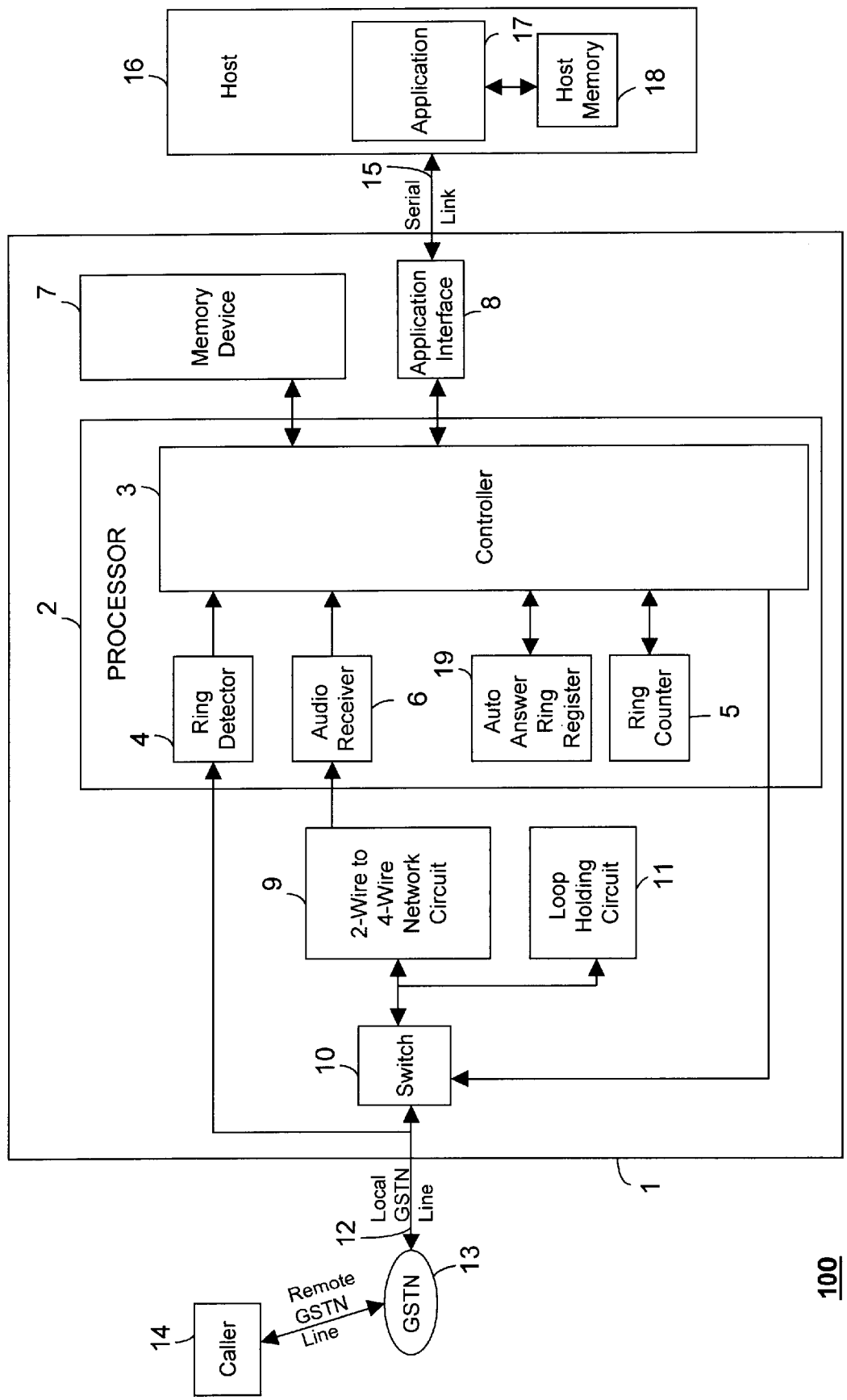
FIG. 1 is a block diagram of a preferred embodiment of a telephone answering apparatus in accordance with the invention.

As shown in FIG. 1, an apparatus 100 for overriding an automatic answer function of a telephone answering device includes a telephone answering device (TAD) 1 in communication with a host computer 16. The telephone answering device 1 is connected to a General Switched Telephone Network (GSTN) 13 through a local GSTN line 12. A caller 14 may establish a telephone connection to the telephone answering device 1 through the General Switched Telephone Network (GSTN) 13 and local GSTN line 12.

The telephone answering device 1 includes a switch 10, a 2-wire to 4-wire network circuit 9, a loop holding circuit 11, and a processor 2. The processor 2 may be any of the commercially available processors. The processor 2 may preferably be a digital signal processor such as, for example, a TMS 320C52 manufactured by Texas Instruments Inc. In the embodiment shown, the processor 2 may preferably execute software or firmware which functionally provides a controller 3, a ring detector 4, an audio receiver 6, an automatic answer ring register 19, and a ring counter 5. One embodiment of the telephone answering device 12 may preferably be the 56K Professional Message Modem supplied by 3Com Corporation. Alternatively, the ring detector 4, audio receiver 6, automatic answer ring register 19, and ring counter 5 may be comprised of discrete circuits which may be operatively connected to the processor 2. The audio receiver 6 is operatively connected to the 2-wire to 4-wire network circuit and to the controller 3. The audio receiver 6 receives messages in the form of an audio signal from the caller 14 and converts the audio signal into audio data. The ring detector 4 is operatively connected to the local GSTN line 12 and to the controller 3. The ring detector 4 detects incoming GSTN ring signals from the GSTN 13. The ring counter 5 is operatively connected to the controller 3 and counts the number of rings detected by the ring detector 4. The automatic answer ring register 19 is operatively connected to the controller 3 and is set to a threshold number of rings required to trigger the automatic answer function of the telephone answering device 1. The controller 3 controls the various functions carried out by the telephone answering device 1.

The switch 10 may be any of the commercially available switches including, for example, a relay switch or an electronic switch. As shown in FIG. 1, one end of the switch 10 is operatively connected to the local GSTN line 12. Another end of the switch 10 is operatively connected to the 2-wire to 4-wire network circuit 9 and the loop holding circuit 11. The switch 10 is also operatively connected to the controller 3. The loop holding circuit 11 is operatively connected to the switch 10 and to the 2-wire to 4-wire network circuit 9. Upon activation of the switch 10 by the controller 3, the loop holding circuit 11 drains current from the GSTN 13. Upon detection of the current drain by the GSTN 13, the GSTN 13 establishes a telephone connection through local GSTN line 12 to the telephone answering device 1. A telephone connection between the caller 14 and telephone answering device 1 may be established if the caller 14 initiates transmission of a ring signal from the GSTN 13, through local GSTN line 12, to the telephone answering device 1.

The 2-wire to 4-wire network circuit 9 is operatively connected to the switch 10 and to the audio receiver 6. The 2-wire to 4-wire network circuit 9 functions to combine signals which are both transmitted and received by the processor 2 along local GSTN line 12. In the embodiment shown in FIG. 1, the 2-wire to 4-wire network circuit 9 routes telephone signals from the local GSTN line 12 to the audio receiver 6.

As shown in FIG. 1, the telephone answering device 1 further includes a memory device 7 which may be any of the commercially available memory devices such as, for example, an EEPROM (Electrically Erasable Programmable Read Only Memory), a SRAM (Static Random Access Memory) or Flash Memory suitable for storing messages received by the telephone answering device 1. In the embodiment shown, the memory device 7 is operatively connected to the controller 3.

The host computer 16 may preferably be, for example, any one of the commercially available computers. An application 17 may be run on the host computer 16. The application 17 may preferably be, for example, any program or software that is executed by the host computer 16 which has the capability to interact with the telephone answering device 1 and perform various functions. These functions may include, for example, receiving incoming messages from the caller 14 through the telephone answering device 1, and retrieving messages from the telephone answering device 1. One embodiment of the application 17 may be supplied by the French Company BVRP Software and may be included with purchase of the 56K Professional Message Modem. An application interface 8 is operatively connected to the controller 3 and to the application 17. The application interface 8 may be any of the commercially available devices (such as, for example, a serial port) suitable for providing an interface between the application 17 of the host computer 16 and the controller 3 of the telephone answering device 1. The host computer 16 may further include host memory 18 operatively connected to the application 17. The host memory 18 may preferably be comprised of any of the commercially available hard disks. The telephone answering device 1 may preferably be operatively connected to the host computer 16 via a conventional serial link 15.

In the embodiment shown in FIG. 1, the telephone answering device 1 may answer incoming calls, receive messages from the caller 14, and store the messages in the memory device 7. Alternatively, when the application interface 8 is enabled, the application 17 of the host computer 16 may answer incoming calls, receive messages from the caller 14, and store the messages in the host memory 18. The application 17 accomplishes this by controlling the telephone answering device 1 with commands which are sent through the serial link 15 to the telephone answering device 1.

In operation, the telephone answering apparatus 1 may be turned on and may be in an "on hook" state, which means there is no telephone connection between the GSTN 13 and the telephone answering device 1. Also, the host computer 16 may be turned on and may be running the application 17. Initially, the telephone ring counter 5 in the processor 2 is reset to zero by the controller 3. The automatic answer ring register 19 is set by a user of the host computer 16 to a threshold number of rings that will trigger the automatic answer function of the telephone answering device 1. In particular, the application 17 sends an appropriate command through the serial link 15 and the application interface 8 to the controller 3. The controller 3 then sets the threshold number of rings based upon the parameters set forth in the command. The command may consist of a conventional AT command that consists of a two ASCII character AT prefix (such as, for example, "A" (41 hex) and "T" (54 hex) or "a" (61 hex) and "t" (74 hex)), a command body consisting of one or more ASCII characters, and an ASCII character carriage return (such as, for example, 0D hex). In the embodiment shown, in order to answer an incoming call, the threshold number of rings programmed into the automatic answer ring register 19 should not be zero. If the number is zero, the telephone answering device 1 will not answer an incoming call even if the application 17 of the host computer 16 is unable to answer the incoming call due to, for example, a failure of the host computer 16.

When there is an incoming call from the caller 14 through the GSTN 13, the GSTN 13 sends a ring signal to the local GSTN line 12. The ring signal consists of bursts of AC signals commonly referred to as "rings" that are separated by periods of silence. The ring detector 4 detects the rings of the ring signal. The ring detector 4 reports each of the rings to the controller 3, which is operatively connected to the ring, counter 5. The ring counter 5 counts the number of rings detected by the ring detector 4. The controller 3 also reports the detected ring to the application 17 by sending a ring response character string or signal through the application interface 8 and the serial link 15. The controller 3 compares the number of rings detected by the ring counter 5 with the threshold number of rings preset in the automatic answering register 19. When the number of detected rings is equal to or greater than the threshold number of rings, the controller 3 starts servicing the incoming call. The controller 3 assumes that the application 17 is not able to receive and store incoming calls. The application 17 may not be able to service incoming calls for a variety of reasons. For example, the application 17 may be suspended or closed by the user of the host computer 16. Alternatively, the application 17 may not be running due to a failure of the host computer 16. Finally, the application 17 may be too busy with other tasks to be able to receive and store messages from the caller 14.

When the controller 3 services the incoming calls, it disables the application interface 8, which prevents any delayed commands from the application 17 from interfering with the servicing of the incoming call. The controller 3 sets the telephone answering device 1 into an "off hook" position by setting switch 10. This establishes a telephone connection between the caller 14 and the telephone answering device 1. The controller 3 of the telephone answering device 1 then receives messages from the caller 14. In particular, the messages (which are in the form of an audio signal) are directed through the GSTN 13, through the local GSTN line 12, through the switch 10, through the 2-wire to 4-wire network circuit 9 to the audio receiver 6. The audio receiver 6 converts the audio signal into digital data. The digital data is then routed by the controller 3 to the memory device 7 where it is stored. When the incoming call terminates, the controller 3 sets the telephone answering device 1 to the "on hook" state by setting switch 10. The controller 3 then enables the application interface 8 so that the application 17 is able to retrieve the digital message data from the memory device 7. When the application 17 retrieves stored digital message data from the memory device 7, the controller 3 retrieves the digital message data stored in the memory device 7 and directs it through the application interface 8 and through the serial link 15 to the application 17. The application 17 directs the retrieved digital message data to the host memory 18 where it is stored.

If the application 17 is able to service the incoming call, the application 17 will start servicing it upon detection of the ring response character string or signal sent by the controller 3. The application 17 services the incoming call by sending appropriate commands through the serial link 15 and the application interface 8 to the controller 3. Since sending commands is the only way the application 17 can service the incoming call, the detection of a command prefix of a command by the controller 3 is interpreted by the controller 3 as an attempt by the application 17 to service the pending incoming call. In the embodiment shown, the controller 3 is prevented from attempting to service the incoming call to avoid the possible conflict created by the application 17 servicing the incoming call. In order to prevent execution of the automatic answer by the controller 3, which is triggered when the number of rings counted by the ring counter 5 is equal to or greater than the threshold number of rings stored in the automatic answer ring register 19, the controller 3 resets the ring counter 5 to zero every time it detects a command prefix from the application 17. As a result, there can be no match between the number of rings counted by the ring counter 5 and the threshold number of rings stored in the automatic answer ring register 19 and, therefore, the automatic answer function of the controller 3 will not be executed. As a result, the application 17 will have exclusive control over the servicing of the incoming call. In order to service the incoming call, the application 17 instructs the telephone answering device 1 by sending appropriate commands. In particular, the application 17 instructs the controller 3 to set the telephone answering device 1 in the "off hook" state by setting the switch 10. This establishes a telephone connection between the caller 14 and the telephone answering device 1. The controller 3 then receives messages in the form of an audio signal from the caller 14. In particular, the messages are directed through the GSTN 13, through the local GSTN line 12, through the switch 10, through the 2-wire to 4-wire network circuit 9 to the audio receiver 6. The audio receiver 6 converts the audio signal into digital data. The digital data is then routed by the controller 3 through the application interface 8, through the serial link 15 to the application 17. The application 17 directs the digital data to the host memory 18 where it is stored for later use.

Figure 2:
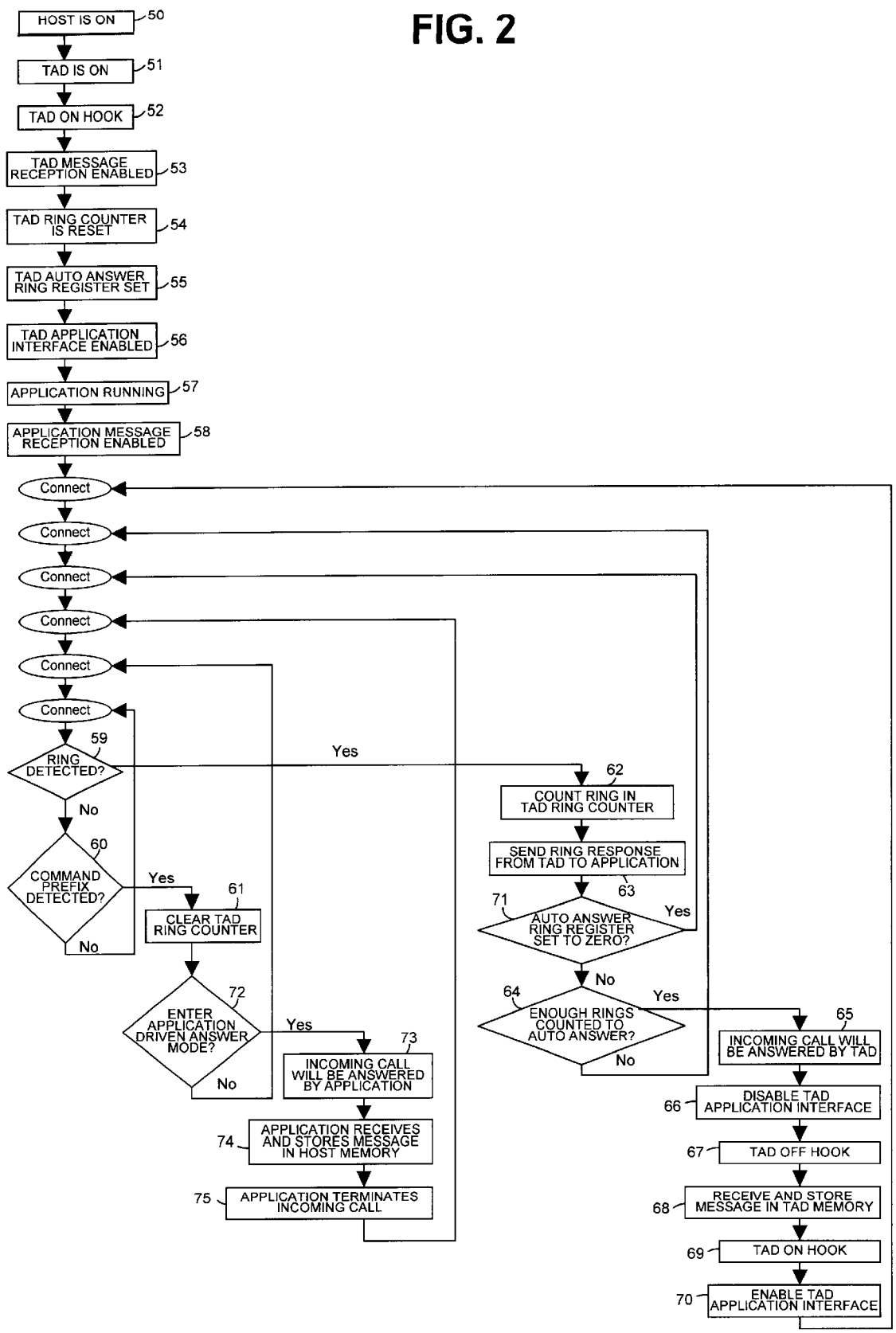
FIG. 2 is a flow chart which illustrates one example of the operation of a telephone answering apparatus in accordance with the invention.

FIG. 2 illustrates one example of the operation of the apparatus 100 for overriding an automatic answer function of the telephone answering device 1 in accordance with the invention. Reference is made to both FIGS. 1 and 2 in the following discussion. Blocks 50–58 represent an example of a set of initial operating conditions of the apparatus 100. The host computer 16 is turned on (Block 50). The telephone answering device 12 is also turned on (Block 51), and is in the "on hook" state or condition (Block 52), which means that there is no telephone connection between the GSTN 13 and the telephone answering device 1. The telephone answering device 1 is enabled by the controller 3 (Block 53) to receive and store messages. The ring counter 5 is reset to a zero (Block 54) and the automatic ring register is set by the host computer 16 to a threshold number of rings that will trigger the automatic answer function of the telephone answering device 1 (Block 55). The application interface 8 is enabled (Block 56). The application 17 is running (Block 57), and the application 17 message reception is enabled (Block 58).

When in the "on hook" state, the telephone answering device 1 is monitoring for the presence of a ring from the GSTN 13 and a command prefix from the application 17 of the host computer 16 (Blocks 59 and 60). If a ring is detected by the ring detector 4 (Block 59), the ring is counted by the ring counter 5 (Block 62). The controller 3 sends a ring response character string or signal through the application interface 8 and serial link 15 to the application 17 (Block 63). If the threshold number of rings stored in the automatic answer ring register 19 is not zero (Block 71), and if the number of rings counted are equal to or greater than the threshold number of rings stored in the automatic answer ring register 19 (Block 64), the incoming call will be answered by the telephone answering device 1 (Block 65). The controller 3 will disable the application interface 8 (Block 66) and set the telephone answering device in the "off hook" position by setting switch 10 (Block 67). The telephone answering device 1 receives and stores messages from the caller 14 (Block 68). In particular, incoming messages are directed through the GSTN 13, through the local GSTN line 12, through the switch 10, through the 2-wire to 4-wire network circuit 9 to the audio receiver 6. The audio receiver 6 converts the audio signal into digital data. The digital data is then routed by the controller 3 to the memory device 7 where it is stored. When the incoming call terminates, the controller 3 sets the telephone answering device 1 to the "on hook" state by setting switch 10 (Block 69). The controller 3 then enables the application interface 8 (Block 70) so that the application 17 is able to retrieve the digital message data from the memory device 7.

If the telephone answering device 1 detects a command prefix from the application 17 (Block 60) before the controller 3 disables the application interface 8 (Block 66), the controller 3 resets the ring counter 5 to zero. In operation, the controller 3 resets the ring counter 5 to zero every time a command prefix is detected by the controller 3. As a result, there can be no match between the number of rings counted by the ring counter 5 and the threshold number of rings stored in the automatic answer ring register 19 and, therefore, the automatic answer function of the controller 3 will not be executed. As a result, the application 17 will have the exclusive control of the servicing of the incoming call. When the telephone answering device 1 enters an application 17 driven mode (Block 72), any incoming calls will be answered by the application 17 (Block 73). The application 17 receives the incoming calls and stores them in the host memory 18 (Block 74). In particular, the application 17 instructs the controller 3 to set the telephone answering device 1 in the "off hook" state by setting the switch 10. The controller 3 then receives messages in the form of an audio signal from the caller 14. In particular, the messages are directed through the GSTN 13, through the local GSTN line 12, through the switch 10, through the 2-wire to 4-wire network circuit 9 to the audio receiver 6. The audio receiver 6 converts the audio signal into digital data. The digital data is then routed by the controller 3 through the application interface 8, through the serial link 15 to the application 17. The application 17 directs the digital data to the host memory 18 where it is stored. The application 17 then terminated the incoming call (Block 75).

The apparatus 100 may be used in a wide variety of automatic telephone answering systems including, for example, automatic telephone message recording equipment, automatic telephone call forwarding equipment, automatic dial-up alarm receiving equipment, and automatic answering data entry systems. It is contemplated that the apparatus 100 may be used in wide variety of other types of telephone answering systems.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for overriding an automatic answer function of a telephone answering device comprising:

providing a host computer in communication with the telephone answering device, the host computer including a host memory and an application for performing functions running on the host computer, the telephone answering device including a controller operatively connected to a ring counter, the application in communication with the controller;

monitoring for the presence of a command prefix from the application;

detecting a command prefix from the application;

resetting the ring counter to zero in response to the command prefix from the application;

disabling an automatic answer function of the telephone answering device; and enabling the application to direct an incoming call from the telephone answering device to the host memory.

2. The method of claim 1 wherein the command prefix is an AT command prefix.

3. The method of claim 1 further comprising:

turning the telephone answering device on; and placing the telephone answering device in an "on hook" state.

4. The method of claim 1 further comprising:

turning the host computer on; and running the application on the host computer.

5. The method of claim 1 further comprising:

enabling the telephone answering device to receive messages.

6. The method of claim 1 further comprising:

resetting the ring counter when the telephone answering device is turned on.

7. The method of claim 1 further comprising:

providing an application interface operatively connected to the controller and to the application, and enabling the application interface.

8. The method of claim 1 further comprising:

enabling the application to receive messages.

9. The method of claim 1 further comprising:

providing an automatic answer ring register operatively connected to the controller; and setting the automatic answer ring register to a threshold number of rings that will trigger the automatic answer function of the telephone answering device.

10. The method of claim 9 further comprising:

providing a ring detector operatively connected to a General Switched Telephone Network (GSTN) and to the controller;

detecting rings from the GSTN;

counting the rings; and sending a ring response signal from the controller to the application.

11. The method of claim 10 further comprising:

comparing the number of rings detected by the ring counter with the threshold number of rings; and enabling the telephone answering device to answer an incoming call if the number of detected rings is equal to or greater than the threshold number of rings.

12. An apparatus for overriding an automatic answer function of a telephone answering device comprising:

a host computer in communication with the telephone answering device, the host computer including a host memory and an application for performing functions running on the host computer, the telephone answering device including a controller operatively connected to a ring counter, the application in communication with the controller wherein the controller resets the ring counter in response to a command prefix from the application which disables an automatic answer function of the telephone answering device and enables the application to direct an incoming call from the telephone answering device to the host memory.

13. The apparatus of claim 12 further comprising an application interface operatively connected to the controller and to the application.

14. The apparatus of claim 13 further comprising a serial link operatively connected to the application interface and the application.

15. The apparatus of claim 12 further comprising a memory device operatively connected to the controller.

16. The apparatus of claim 12 further comprising a ring detector operatively connected to the controller.

17. The apparatus of claim 12 further comprising an automatic answer ring register operatively connected to the controller.

18. The apparatus of claim 12 further comprising an audio receiver operatively connected to the controller.

19. The apparatus of claim 12 further comprising a 2-wire to 4-wire network circuit operatively connected to the receiver.

20. The apparatus of claim 19 further comprising a loop holding circuit operatively connected to the 2-wire to 4-wire network circuit.

21. The apparatus of claim 19 further comprising a switch operatively connected to the 2-wire to 4-wire network circuit.

* * * * *